United States Patent [19]
Jeon et al.

[11] Patent Number: 6,122,074
[45] Date of Patent: Sep. 19, 2000

[54] METHOD FOR REPORTING MESSAGE TRANSMISSION IN FACSIMILE

[75] Inventors: Seon-A Jeon, Kyongsangnam-do; Eun-Sook Kang, Chinju, both of Rep. of Korea

[73] Assignee: SamSung Electronics Co., Ltd., Suwon, Rep. of Korea

[21] Appl. No.: 09/082,383

[22] Filed: May 21, 1998

[30] Foreign Application Priority Data

May 21, 1997 [KR] Rep. of Korea ................. 97-19822

[51] Int. Cl.[7] ............................................... H04N 1/00
[52] U.S. Cl. ........................... 358/440; 379/100.06
[58] Field of Search .............................. 358/402, 434, 358/440, 442; 379/100.06, 100.09, 100.05, 100.14

[56] References Cited

U.S. PATENT DOCUMENTS

| 4,654,718 | 3/1987 | Sueyoshi | 358/257 |
|---|---|---|---|
| 4,764,951 | 8/1988 | Kotani | 379/100 |
| 4,811,111 | 3/1989 | Kurokawa | 358/257 |
| 4,847,891 | 7/1989 | Kotani | 379/88 |
| 4,893,333 | 1/1990 | Baran et al. | 379/100 |
| 4,956,860 | 9/1990 | Murata | 379/100 |
| 4,974,254 | 11/1990 | Perine et al. | 379/100 |
| 4,975,841 | 12/1990 | Kehnemuyi et al. | 364/401 |
| 5,127,047 | 6/1992 | Bell et al. | 379/100 |
| 5,155,601 | 10/1992 | Toyama | 358/401 |
| 5,224,156 | 6/1993 | Fuller et al. | 379/100 |
| 5,295,181 | 3/1994 | Kuo | 379/100 |
| 5,301,035 | 4/1994 | Hayafune | 358/440 |
| 5,337,156 | 8/1994 | Nakamura et al. | 358/404 |
| 5,692,036 | 11/1997 | Saito | 379/533 |
| 5,822,409 | 10/1998 | Chang et al. | 379/100.06 |

*Primary Examiner*—Edward L. Coles
*Assistant Examiner*—Derrick Fields
*Attorney, Agent, or Firm*—Robert E. Bushnell, Esq.

[57] ABSTRACT

A facsimile automatically reports transmission of a facsimile message upon transmitting the facsimile message. For reporting the message transmission, facsimile numbers of called parties are stored in a memory together with their corresponding telephone numbers. Then, the facsimile message is transmitted to a called facsimile corresponding to any one of the facsimile numbers. Thereafter, the facsimile immediately dials the corresponding telephone number to transmit a transmission reporting voice message.

4 Claims, 4 Drawing Sheets

METHOD FOR REPORTING MESSAGE TRANSMISSION IN FACSIMILE

BACKGROUND OF THE INVENTION

1. Technical Field

The present invention relates to a facsimile and, in particular, to a method for reporting transmission of a facsimile message upon transmitting the facsimile message.

2. Related Art

In general, a facsimile registers message reception information into a management report upon printing a received facsimile message. The message reception is reported by generating an alarm through a speaker, or by displaying a message reception status on a display of an operating panel. Such message reception reporting methods are useful only when the user stays around the facsimile. In other words, when the user does not stay around the facsimile, he or she cannot be aware of the reception of a facsimile message even though the facsimile generates the alarm or displays the message reception status.

Accordingly, after transmitting an important message, the sender should call the receiver to notify him of transmission of the facsimile message, but this is inconvenient, annoying and time-consuming for the sender.

The following patents are considered to be representative of the prior art, and are burdened by the disadvantages set forth herein:

U.S. Pat. No. 5,692,036 entitled Facsimile Apparatus Having Auto Calling Function issued to Saito, U.S. Pat. No. 5,337,156 entitled Image Output Device And Facsimile Management Report Output Method issued to Nakamura et al., U.S. Pat. No. 5,301,035 entitled Facsimile Apparatus having Redialing Function issued to Hayafune, U.S. Pat. No. 4,975,841 entitled Method And Apparatus For Reporting Customer Data issued to Kehnemuyi et al., U.S. Pat. No. 4,974,254 entitled Interactive Data Retrieval System For Producing Facsimile Reports issued to Perine et al., U.S. Pat. No. 4,956,860 entitled System For Reporting Status Data In A Facsimile Network issued to Murata, U.S. Pat. No. 4,893,333 entitled Interactive Facsimile System And Method Of Information Retrieval issued to Baran et al., U.S. Pat. No. 4,811,111 entitled Facsimile Machine Having A Function Of Transmitting Source And Destination Information issued to Kurokawa, and U.S. Pat. No. 4,764,951 entitled Auto Dialer For Use With Telecopiers Or The Like issued to Kotani et al..

SUMMARY OF THE INVENTION

It is, therefore, an object of the present invention to provide a method for automatically reporting transmission of a facsimile message upon transmitting the facsimile message, thereby preventing a receiving party from ignoring or missing the facsimile message.

To achieve the above object, there is provided a method for reporting message transmission. For reporting the message transmission, facsimile numbers of called parties are stored in a memory together with their corresponding telephone numbers. Then, when a facsimile message is transmitted to a called facsimile corresponding to any one of the facsimile numbers, the facsimile immediately dials its corresponding telephone number to transmit a voice message reporting the transmission.

BRIEF DESCRIPTION OF THE DRAWINGS

The objects and advantages of the present invention will become more apparent by describing in detail a preferred embodiment thereof with reference to the attached drawings in which.

DETAILED DESCRIPTION OF THE PREFERRED EMBODIMENT

A preferred embodiment of the present invention will be described in detail with reference to the attached drawings. Many specific details described in the specification and accompanying drawings are described for comprehensive understanding of the present invention. However, as is known to anyone skilled in the art, the present invention can be implemented without the details. In addition, detailed description of known operation and structure of the present invention is avoided lest it should obscure the subject matter of the present invention.

Figure 1:
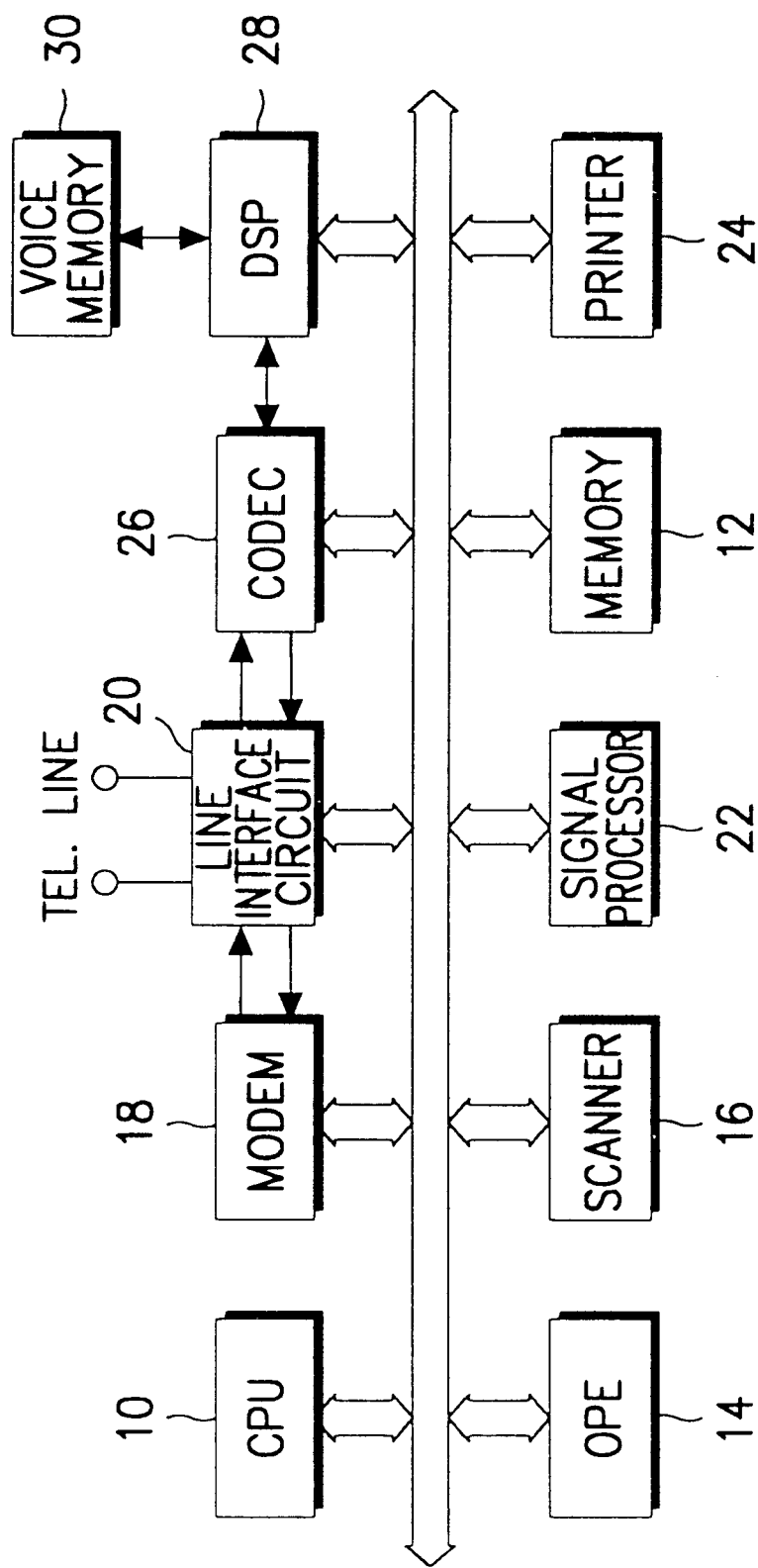
FIG. 1 is a block diagram of a facsimile to which the present invention is applicable.

Reference will be first made to the structure of the facsimile illustrated in FIG. 1. In the drawing, a central processing unit (CPU) 10 controls overall operation of the facsimile according to a program stored in a memory 12. The memory 12 includes a ROM (Read Only Memory) and a RAM (Random Access Memory), in which the ROM stores the operating program of the CPU 10, a protocol control program and various reference data, and the RAM stores data generated according to execution of the operating program of the CPU 10. An operating panel equipment (OPE) 14 includes a plurality of numeric keys and function keys, and a display for providing the CPU 10 with key data according to a key input and for displaying various operating status of the facsimile under the control of the CPU 10. A scanner 16 scans a document and outputs image data according to a document image. The image data output from the scanner 16 is stored in the memory 12 after being processed by a signal processor 22, and is transmitted to a telephone line via a MODEM 18 or printed by a printer 24. The MODEM 18 modulates the image data and the output data of the CPU 10 into an analog signal so as to transmit the modulated signal to the telephone line through a line interface circuit 20, and the MODEM 18 demodulates a received analog signal from the telephone line. The line interface circuit 20 forms a communication path between the MODEM 18 and the telephone line, and between a CODEC (Coder-Decoder) 26 and the telephone line, under the control of the CPU 10. The signal processor 22 encodes and decodes the image data output from the scanner 16 and the image data transmitted and received through the MODEM 18. The printer 24 prints the image under the control of the CPU 10. A digital signal processor (DSP) 28 analyzes voice data input from the CODEC 26 to store it in a voice memory 30, or synthesizes the voice data stored in the voice memory 30 to provide it to the CODEC 26. The CODEC 26 converts the voice data input from the DSP 28 into an analog voice signal, and provides the converted voice signal to the line interface circuit 20.

In general, the facsimile includes a number of function modes. In particular, the facsimile includes an input mode in which a user can input facsimile numbers for a one-touch dial function and facsimile numbers for a speed dial function through the operating panel equipment 14. In accordance with a preferred embodiment of the present invention, the user inputs the facsimile numbers for the one-touch dial function and the facsimile numbers for the speed dial function, together with telephone numbers for receivers corresponding to the above facsimile numbers. For example, the telephone numbers corresponding to the facsimile numbers may be the telephone numbers of a company, an office, or a department using the corresponding facsimile numbers, and the message transmission report according to the present invention will be given to these telephone numbers.

Figure 2:
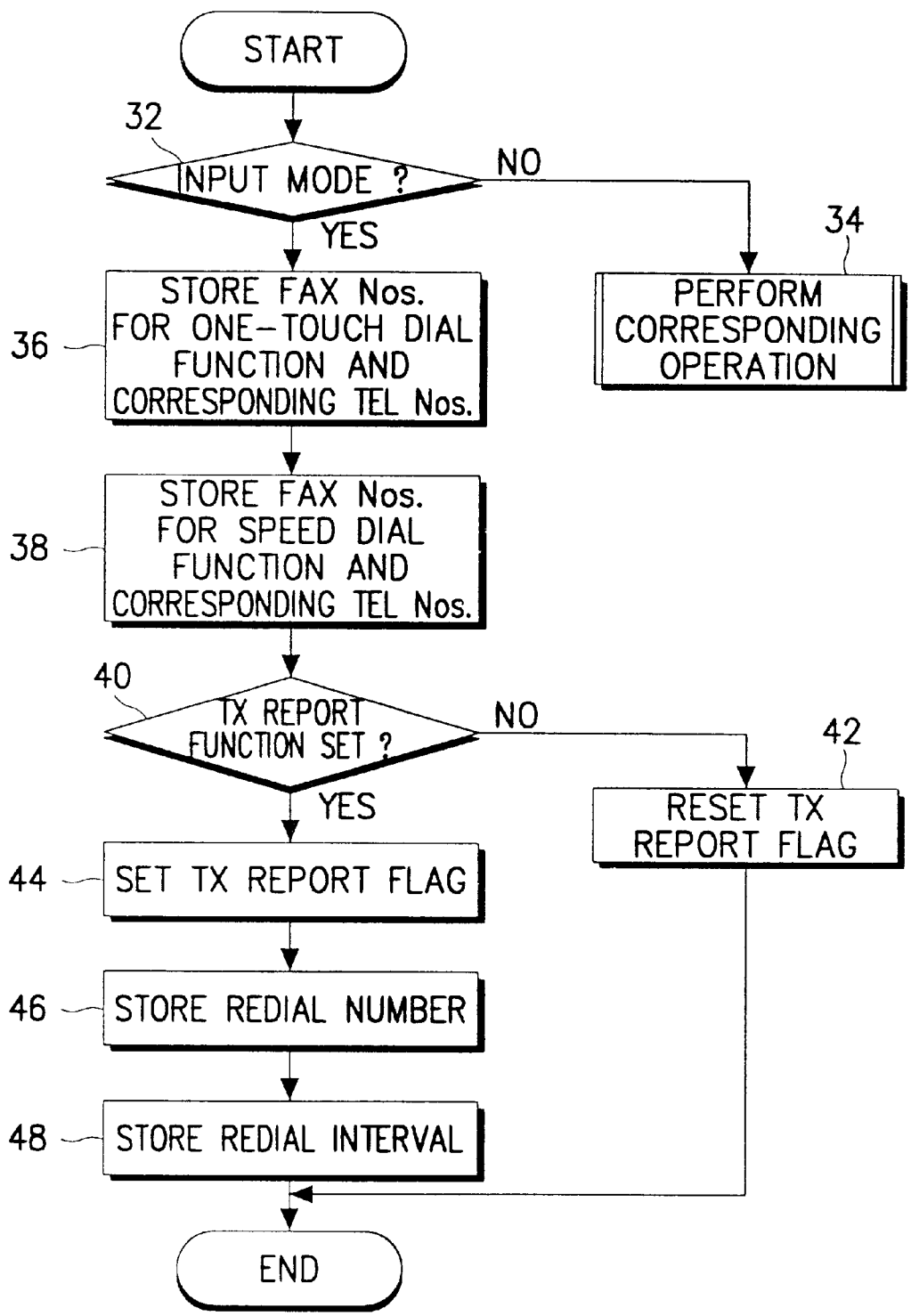
FIG. 2 is a flow chart of an input mode according to a preferred embodiment of the present invention.

FIG. 2 shows a flow chart of the input mode described above. Referring to FIG. 2, at step 32, the CPU 10 checks whether the user has set the input mode through the operating panel equipment 14. If the user has set the input mode, the CPU 10 performs step 36; otherwise, the CPU 10 proceeds to step 34 to perform an operation which was being executed previously.

After setting the input mode, the user can input the facsimile numbers for the one-touch dial function, together with their corresponding telephone numbers. At step 36, the CPU 10 stores in the memory 12 the facsimile numbers for the one-touch dial function and their corresponding telephone numbers that the user has input through the operating panel equipment 14. After storage of the facsimile numbers and the telephone numbers, the user can input the facsimile numbers for the speed dial function, together with their corresponding telephone numbers. Then, at step 38, the CPU 10 stores in the memory 12 the facsimile numbers for the speed dial function and their corresponding telephone numbers that the user has input through the operating panel equipment 14.

After inputting the facsimile numbers and the telephone numbers, the user can set a transmission report function through the operating panel equipment 14. The CPU 10 checks at step 40 whether the user has set the transmission report function through the operating panel equipment 14. If the transmission report function is not set, the CPU 10 resets at step 42 a first bit BIT0 of a transmission report flag in the memory 12, and then ends the procedure. However, if the transmission report function is set by the user, the CPU 10 sets the first bit BIT0 of the transmission report flag in the memory 12 at step 44. After that, the CPU 10 stores the number of redials for the transmission report that the user inputs with the operating panel equipment 14 into a redial number storage area of the memory 12, at step 46. After storage of the number of redials, the CPU 10 stores a redial interval for the transmission report that the user inputs with the operating panel equipment 14 at step 48, and then ends the procedure.

Table 1 shows a memory map of the memory 12, including storage areas for storing therein the information that the user inputs in the input mode.

TABLE 1

| 1st One-Touch Dial Info. Storage Area | FAX Number Storage Area, 40 Digits (20 Bytes) Tel. Number Storage Area, 40 Digits (20 Bytes) Name Storage Area, 20 Digits (20 Bytes) |
|---|---|
| . | . |
| . | . |
| . | . |
| N-th One-Touch Dial Info. Storage Area | FAX Number Storage Area, 40 Digits (20 Bytes) Tel. Number Storage Area, 40 Digits (20 Bytes) Name Storage Area, 20 Digits (20 Bytes) |
| 1st Speed Dial Info. Storage Area | FAX Number Storage Area, 40 Digits (20 Bytes) Tel. Number Storage Area, 40 Digits (20 Bytes) Name Storage Area, 20 Digits (20 Bytes) |
| . | . |
| . | . |
| . | . |
| M-th Speed Dial Info. | FAX Number Storage Area, 40 Digits (20 Bytes) |

TABLE 1-continued

| Storage Area | Tel. Number Storage Area, 40 Digits (20 Bytes) Name Storage Area, 20 Digits (20 Bytes) |
|---|---|
| General Dial Info. Storage Area | FAX Number Storage Area, 40 Digits (20 Bytes) Tel. Number Storage Area, 40 Digits (20 Bytes) |
| Self ID Storage Area | Self Name Storage Area, 20 Digits (20 Bytes) Self Tel. No. Storage Area, 20 Digits (20 Bytes) |
| Transmission Report Flag | Transmission Report Setting Information Storage Area (1 Byte) |
| Redial Number Storage Area | Redial Number Storage Area (1 Byte) Redial Number Counter Area (1 Byte) |
| Redial Interval Storage Area | Redial Interval Storage Area (1 Byte) Redial Interval Timer Area (1 Byte) |

As shown in Table 1, first to N-th one-touch dial information storage areas store the facsimile numbers for the one-touch dial function, and their corresponding telephone numbers and names. First to M-th speed dial information storage areas store the facsimile numbers for the speed dial function, and their corresponding telephone numbers and names. A general dial information storage area stores a facsimile number and its corresponding telephone number for use when a user transmits a document without using the one-touch dial function or the speed dial function. A self ID (Identification) storage area stores a self name and a self telephone number which are used when transmitting the self information to a TSI (Time Slot Interchange) unit during the message transmission.

Further, the transmission report flag is shown in detail in Table 2.

TABLE 2

| Bits | 7 6 5 4 3 | BIT 1 | BIT 2 | BIT 3 |
|---|---|---|---|---|
| Display Info. | Unused | Tx Results 1:Tx Error 2:Tx Success | Tx Rpt Exec. 1: Success 2: Fail | Tx Report Func. 1: Enable 0: Disable |

In Table 2, the first bit BIT0 of the transmission report flag is to store transmission report setting information entered by the user; the CPU 10 sets the first bit BIT0 to "1" if the user sets the transmission report function; otherwise, it is set to "0". A second bit BIT1 of the transmission report flag is to store information indicating whether the transmission report is made successfully or not; the CPU 10 sets the second bit BIT1 to "1" if the transmission report after the message transmission is made successfully; otherwise, it is set to "0". Furthermore, a third bit BIT2 of the transmission report flag is to store the message transmission result; the CPU 10 sets the third bit BIT2 to "1" when a transmission error occurs during the message transmission; otherwise, it is set to "0".

The memory 12 includes an area for storing the number of redials that the user has input, and an area for storing a count value of the redialed number.

The redial number storage area has one byte composed of 8 bits, in which only the first three bits BIT0–BIT2 are used, as illustrated in Table 3. The three bits BIT0–BIT2 of "000" indicates that the number of redials is zero, the bits "001" indicates that a number is to be redialed once, the bits "010" indicates that a number is to be redialed twice, the bits "011" indicates that a number is to be redialed three times, the bits "100" indicates that a number is to be redialed four times, the bits "101" indicates that a number is to be redialed five times, the bits "110" indicates that a number is to be redialed six times, and the bits "111" indicates that a number is to be redialed seven times. In this manner, the user can input a number of redials ranging from 0 to 7 times.

TABLE 3

| Bits | 7 6 5 4 3 | BIT2 | BIT1 | BIT0 |
|---|---|---|---|---|
| Info. | Unused | \multicolumn{3}{l}{Redial Number Counter 000: None, 001: Once, 010: Twice, 011: 3 Times 100: 4 Times, 101: 5 Times, 110: 6 Times, 111: 7 Times} | | |

The CPU 10 reads the redial number input by the user after the message transmission, and loads it into a redial number counter. Thereafter, each time the telephone number is redialed, the CPU 10 decreases the count value of the redial number counter by one until the count value become zero.

In addition, memory 12 includes a redial interval storage area for storing the redial interval and an area for storing a value of a redial interval timer. The area for storing the redial interval has one byte composed of 8 bits of which only, the first three bits BIT0–BIT2 are used. For example, the bits BIT0–BIT2 of "000" indicate a redial interval of one minute, the bits "001" indicate a redial interval of two minutes, the bits "010" indicate a redial interval of three minutes, the bits "011" indicate a redial interval of four minutes, the bits "100" indicate a redial interval of five minutes, the bits "101" indicate a redial interval often minutes, the bits "110" indicate a redial interval of twenty minutes, and the bits "111" indicate a redial interval of thirty minutes. In this way, the user can input a redial interval ranging from one to thirty minutes.

Similarly, the area for storing the value of the redial interval timer has one byte composed of 8 bits of which only the first three bits are used. The CPU 10 reads the redial interval value from the redial interval storage area after the message transmission so as, to load it into the area for storing the value of the redial interval timer. After that, the CPU 10 drives an internal timer to perform redialing when the time set by the bits BIT0–BIT2 has elapsed.

Now, referring to FIGS. 1 to 3B and Tables 1 to 3, operation of the preferred embodiment of the present invention will be described in detail.

Figure 3A:
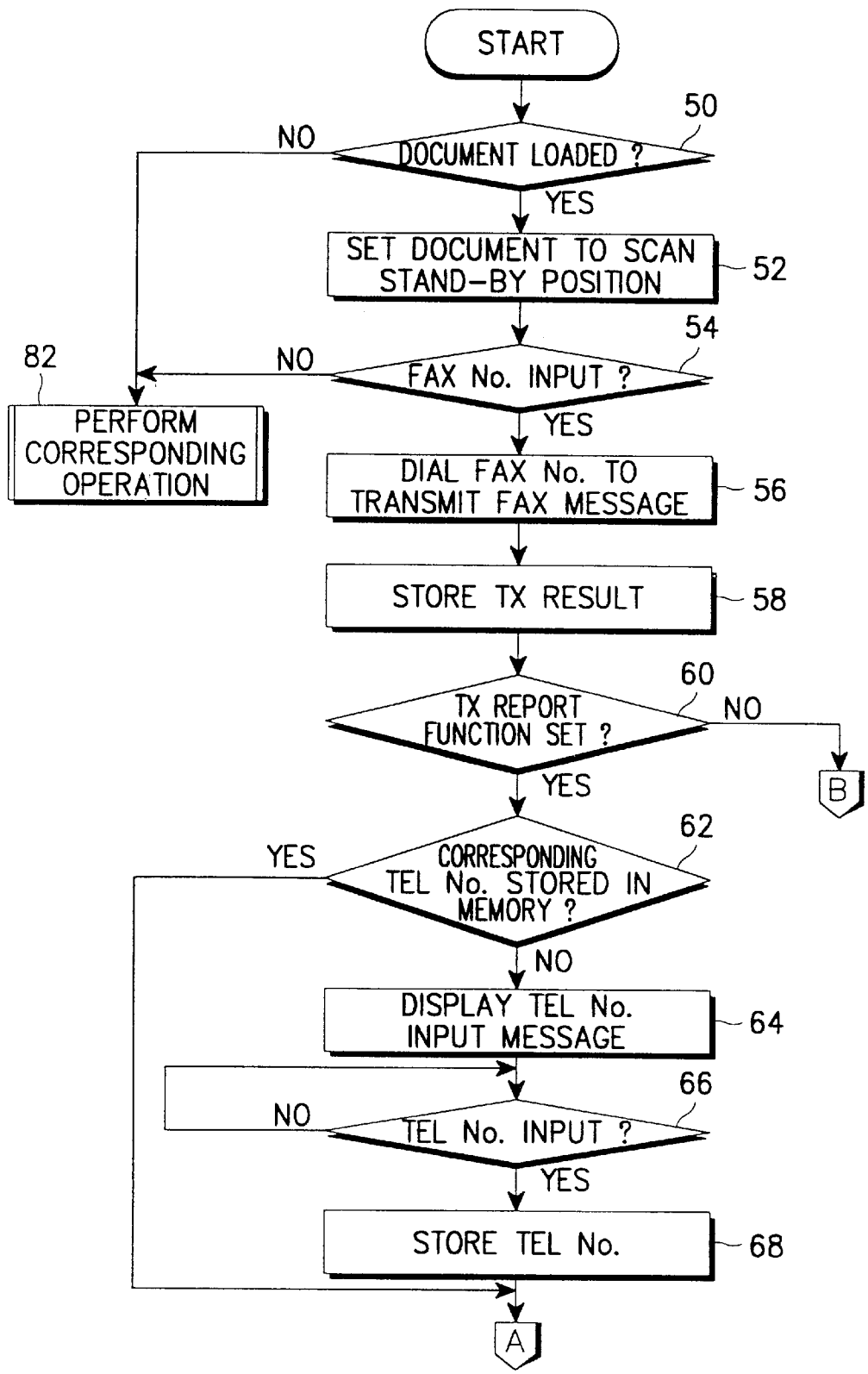
FIGS. 3A and 3B are flow charts for reporting transmission of a facsimile message according to a preferred embodiment of the present invention.
Figure 3B:
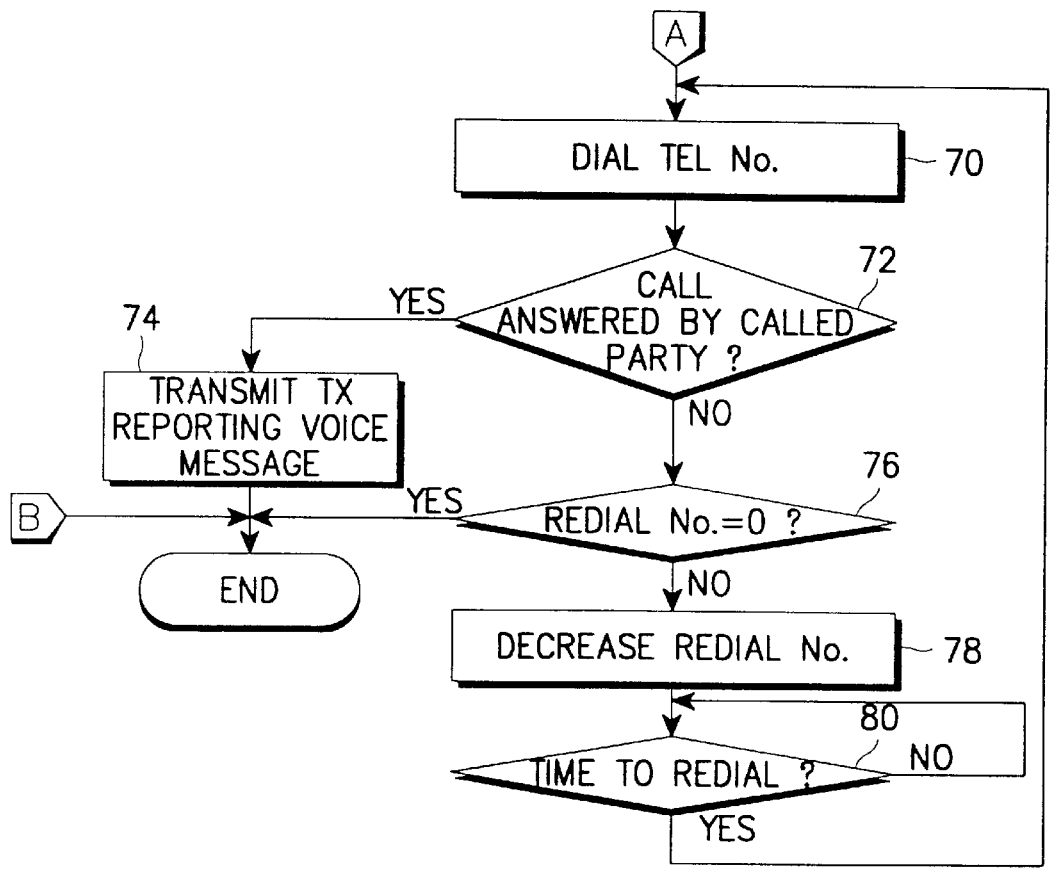

At step 50 of FIG. 3A, the CPU 10 checks whether a document is loaded onto a document tray (not shown) by using a document detection sensor (not shown). If the document is not loaded, the CPU proceeds to step 82 to perform a corresponding operation (i.e., an operation which was being executed previously). However, if the document is loaded, the CPU 10 conveys the document up to a scan stand-by position at step 52, and checks at step 54 whether the user has input the facsimile number. The user can input the facsimile number by using the one-touch dial function and the speed dial function, or by depressing the dial buttons. If the user has not input the facsimile number, the CPU 10 proceeds to step 82 to perform the corresponding operation. However, if the user has input the facsimile number, the CPU 10 dials (at step 56) the facsimile number that the user has input, so as to transmit the facsimile message according to the document. After the message transmission, the CPU 10 stores the transmission result at step 58. Specifically, if the message transmission was successful, the CPU 10 sets the third bit BIT2 of the transmission report flag to "0"; otherwise, CPU 10 sets the third bit BIT2 to "1".

After storing the transmission result, the CPU 10 checks at step 60 whether the user has set the transmission report function in the input mode. In other words, the CPU 10 checks as to whether or not the first bit BIT0 of the transmission report flag is set. If the first bit BIT0 is set, the CPU 10 proceeds to step 62; otherwise, it ends the procedure. At step 62, the CPU 10 checks whether the telephone number corresponding to the dialed facsimile number that the user has input is stored in the memory 12. In the case of the one-touch dial function or the speed dial function, the telephone number corresponding to the dialed facsimile number is stored in the memory 12. However, in the case of directly dialing the facsimile number without using the one-touch dial function or the speed dial function, its corresponding telephone number is not stored in the memory 12. Therefore, if the facsimile number was input by using the one-touch dial function or the speed dial function, the CPU 10 proceeds to step 70, considering that the telephone number corresponding to the facsimile number is stored in the memory 12. Alternatively, if the user has input the facsimile number by using the dial buttons, the CPU 10 proceeds to step 64, considering that the telephone number corresponding to the facsimile number is not stored in the memory 12. At step 64, the CPU 10 displays, on the operating panel equipment 14, a message requesting the user to input the telephone number to which the transmission report is to be given. Then, upon seeing the message displayed, the user will input the telephone number for the transmission report.

After that, the CPU 10 proceeds to step 66 and waits until the user inputs the telephone number to which the transmission report is to be made. Once the user inputs the telephone number, the CPU 10 proceeds to step 68 to store the telephone number input by the user. After storing the input telephone number, if the memory 12 has the telephone number corresponding to the facsimile number of the called party, the CPU 10 proceeds to step 70 to dial the telephone number. After dialing the telephone number, the CPU 10 checks at step 72 whether the called party answers the call by picking up the handset. If the called party answers the call, the CPU 10 proceeds to step 74; otherwise, it proceeds to step 76. At step 74, the CPU 10 checks the transmission result. If the message transmission was made successfully, the CPU 10 reads a voice message for the successful transmission stored in the voice memory 30, and instructs the DSP 28 to transmit the voice message to the called party through the CODEC 26 and the telephone line. Conversely, if the facsimile failed to transmit the facsimile message, the CPU 10 reads a voice message for the transmission failure stored in the voice memory 30, and instructs the DSP 28 to transmit that voice message to the called party through the CODEC 26 and the telephone line. After transmitting the transmission reporting voice message, the procedure is ended.

For reference, a memory map of the voice memory 30 is illustrated in Table 4.

TABLE 4

| | |
|---|---|
| Storage Area for Voice Message for Successful Transmission | "Hello, I am with Samsung and have just sent your company a facsimile message. Please review it." |
| Storage Area for Voice Message for Transmission Failure | "Hello, I am with Samsung and have just sent your company a facsimile message. However, a communication error has occurred in the interim. Please check it." |
| Other Message Storage Area | Other Voice Messages |

As shown in Table 4, the voice memory 30 stores various voice messages for the transmission report in accordance with the transmission states.

The DSP 28 reads the voice message for the successful transmission from the voice memory 30 and transmits it to the called party through the CODEC 26 and the telephone line, in response to a successful transmission report command from the CPU 10. Conversely, in response to a transmission failure report command from the CPU 10, the DSP 28 reads the voice message for the transmission failure from the voice memory 30 and transmits it to the called party through the CODEC 26 and the telephone line.

If the called party does not answer the call at step 72, the CPU 10 proceeds to step 76 to check whether the redial number stored in the redial number counter is zero. If it is zero, the CPU 10 ends the procedure; otherwise, it proceeds to step 78 to decrease the redial number stored in the redial number counter by one. Thereafter, at step 80, the CPU 10 drives the internal counter and checks whether the timer has a value identical to the value stored in the redial interval timer. If so, the procedure returns to step 70 to redial the telephone number.

As described above, the facsimile of the invention telephones the called party immediately after transmitting the facsimile message, to report the message transmission by voice. Accordingly, the called party may promptly collect the received facsimile message.

While the present invention has been described in detail with reference to the specific embodiment, it is clearly understood that many variations can be made by anyone skilled in the art within the scope and spirit of the present invention. Thus, the appropriate scope hereof is deemed to be in accordance with the claims as set forth below.

What is claimed is:

1. A method for reporting a facsimile message transmission from a calling facsimile machine, comprising the steps of:

storing, into the calling facsimile machine, facsimile numbers of called facsimile machines and their corresponding voice telephone numbers;

transmitting a facsimile message to a called facsimile machine;

checking whether a transmission report function is set;

checking whether the corresponding voice telephone number of the called facsimile machine is stored when the transmission report function is set;

dialing the corresponding voice telephone number of the called facsimile machine to transmit a transmission reporting voice message thereto when the corresponding voice telephone number is stored;

displaying a message requesting a user to input a voice telephone number corresponding to the called facsimile machine when the corresponding voice telephone number of the called facsimile machine is not stored; and dialing the voice telephone number corresponding to the called facsimile machine to transmit a transmission reporting voice message thereto when the voice telephone number corresponding to the called facsimile machine is input by the user.

2. The method as claimed in claim 1, further comprising the step of redialing the voice telephone number corresponding to the called facsimile machine after the dialing of said voice telephone number corresponding to the called facsimile machine is not answered in a predetermined time interval after dialing.

3. The method as claimed in claim 2, wherein the voice telephone number corresponding to the called facsimile machine is repeatedly dialed a predetermined number of times.

4. The method as claimed in claim 2, wherein the voice telephone number corresponding to the called facsimile machine is repeatedly dialed at predetermined time intervals.

* * * * *